(12) United States Patent
Jorgenson et al.

(10) Patent No.: US 6,845,390 B1
(45) Date of Patent: Jan. 18, 2005

(54) SERVER-SIDE STATE REPLICATION AMONG COLLABORATING WORLD WIDE WEB SERVERS

(75) Inventors: Daniel Scott Jorgenson, San Jose, CA (US); Kenneth Joseph Schulz, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 810 days.

(21) Appl. No.: 09/710,728

(22) Filed: Nov. 10, 2000

(51) Int. Cl.[7] ............................................. G06F 15/16
(52) U.S. Cl. ...................... 709/205; 709/217; 709/218; 709/219
(58) Field of Search ............................... 709/203–205, 709/217–219; 710/106

(56) References Cited

U.S. PATENT DOCUMENTS

| | | | | | |
|---|---|---|---|---|---|
| 5,220,657 A | * | 6/1993 | Bly et al. | .................... | 711/152 |
| 5,774,670 A | * | 6/1998 | Montulli | ..................... | 709/227 |
| 5,870,769 A | * | 2/1999 | Freund | ..................... | 715/501.1 |
| 5,946,695 A | * | 8/1999 | Hinrichs et al. | ........ | 707/103 R |
| 6,134,592 A | * | 10/2000 | Montulli | ..................... | 709/229 |
| 6,151,622 A | * | 11/2000 | Fraenkel et al. | ............. | 709/205 |
| 6,317,777 B1 | * | 11/2001 | Skarbo et al. | ............... | 709/204 |
| 6,425,016 B1 | * | 7/2002 | Banavar et al. | ............. | 719/310 |
| 6,490,624 B1 | * | 12/2002 | Sampson et al. | ........... | 709/227 |
| 6,510,439 B1 | * | 1/2003 | Rangarajan et al. | ........ | 707/201 |
| 6,539,381 B1 | * | 3/2003 | Prasad et al. | .................. | 707/10 |
| 6,589,290 B1 | * | 7/2003 | Maxwell et al. | ............ | 715/507 |
| 6,636,889 B1 | * | 10/2003 | Estrada et al. | ............... | 709/203 |
| 6,658,417 B1 | * | 12/2003 | Stakutis et al. | ................ | 707/10 |
| 6,772,333 B1 | * | 8/2004 | Brendel | ...................... | 713/153 |

* cited by examiner

*Primary Examiner*—David Wiley
*Assistant Examiner*—Thomas Duong

(57) ABSTRACT

A system and method are provided for replicating state among collaborating World Wide Web servers connected to a computer network. When a collaborating Web server needs to access state information, the collaborating Web server first determines whether the state information has been modified since the last time the collaborating Web server accessed the state information. If the state information has been modified, the collaborating Web server requests a copy of the state information from the last collaborating Web server to modify the state information. As a result, state information is only replicated among collaborating Web servers on an as-needed basis, greatly reducing the amount of data that needs to be replicated among collaborating Web servers.

39 Claims, 6 Drawing Sheets

SERVER-SIDE STATE REPLICATION AMONG COLLABORATING WORLD WIDE WEB SERVERS

BACKGROUND OF THE INVENTION

1. Field of the Invention

The present invention relates generally to World Wide Web servers and, more particularly, to techniques for replicating state among World Wide Web servers.

2. Related Art

Current World Wide Web servers ("Web servers") are accessed by client computers using the Hypertext Transfer Protocol (HTTP) or its encrypted form (HTTPS). A typical interaction between the client computer and a Web server consists of several HTTP and/or HTTPS requests. For example, when a user of the client computer first accesses a Web site via a Web browser, an HTTP connection request is sent to a Web server maintaining the Web site. The HTTP request contains a Uniform Resource Identifier (URI) which specifies the Web page being requested. The Web server, in turn, responds to the HTTP request by downloading the requested Web page (e.g., a Hypertext Markup Language (HTML) file) to the client computer. The Web page is then interpreted by the Web browser executing on the client computer and displayed to the user. If the user selects a hyperlink on the Web page, a new HTTP/HTTPS request is sent to the Web server, which may result in a new Web page being downloaded to the client computer.

Since the HTTP/HTTPS protocols are inherently stateless (namely, an HTTP/HTTPS request intrinsically contains no information about the outcome of a prior request), a Web server communicating with a client computer cannot rely on these protocols for maintaining state (i.e., storing information about the stage of processing of the client computer's overall interaction with the server). The series of discrete HTTP/HTTPS transactions over which state is maintained is typically referred to as a "session." As the amount of state data to be maintained increases, or sensitive information is included among it, techniques for exchanging the state data explicitly across HTTP/HTTPS become unsuitable and the state data must be maintained locally on the Web server or some other computer (e.g., a database server) to which the Web server has direct access. Instead of transferring a large amount of sensitive state data, a small token uniquely referencing the state data is exchanged by the client and server across HTTP/HTTPS, while the state data itself is kept on the server. This general architecture is referred to as "server-side state," and the reference token as a "session ID." Server computers in this architecture are thus referred to as "stateful."

As the number of users increases, a typical Web site cannot handle all users' requests using a single server, but rather has to employ a pool of servers to handle user requests. FIG. 1A illustrates a client 110 and a pool of Web servers 120*n* (where n=A, B, C, . . . ) connected by a computer network 130. If state is maintained during a session, either the client must always connect to the same server during the session, or state must be shared among all servers in the pool. When state is maintained server-side, this presents the problem of replicating state information throughout the servers in the pool. Servers that replicate server-side state data in this fashion are referred to as "collaborating" servers.

In some cases, all of the collaborating Web servers 120*n* of FIG. 1A provide the same set of services redundantly (where the redundancy is purely for purposes of accommodating large numbers of users). For example, servers 120*n* might all provide a company's online product support services. In other cases, however, it is advantageous to replicate server-side state among servers providing different sets of services to the same users. For example, servers 120A and 120B might redundantly provide a company's online product support services, while server 120C might provide the company's online product catalog, and server 120D might provide the company's online product store.

Furthermore, in the case where servers 120*n* provide different services, the state data being replicated might constitute all of the data tracked for a user or session by each service. But in other cases, just a common subset of the state data might need to be replicated. Indeed, in some of these cases, there might be multiple such subsets, each needing to be shared and hence replicated independently among particular services. To build on the prior example, only servers 120A and 120B (the product support service) and server 120D (the product ordering store) might share product order history data. Only servers 120D and 120C (the online catalog) in turn might share product preference data. And all four servers might share user registration data.

Thus replicating one or more server-side state objects across one or more (possibly heterogeneous) Web server collaboration pools becomes necessary to share the appropriate sets of state data among the appropriate Web services. Typical prior art collaborating Web servers (e.g., collaborating Web server 120A) would share state data by broadcasting any changes in the state data to all other collaborating Web servers (e.g., collaborating Web servers 120B, 120C and 120D), as shown in FIG. 1B. While this approach works satisfactorily when the number of collaborating Web servers is small, it becomes increasingly more impractical when the number of collaborating Web servers and/or the amount of state data shared among the collaborating Web servers grows. As a result, there is a need for an improved system for replicating server-side state amongst stateful Web servers that overcomes these limitations.

SUMMARY OF THE INVENTION

The system and method of the present invention overcome the limitations of the prior art discussed above. When a collaborating Web server needs to access a state object, the collaborating Web server first determines whether the state object has been modified since the last time the collaborating Web server accessed the state object. If the state object has been modified, the collaborating Web server requests a copy of the state object from the last collaborating Web server to modify the state object. As a result, state objects are only replicated among collaborating Web servers on an as-needed basis, greatly reducing the amount of data that needs to be replicated among collaborating Web servers. In addition, since state objects are only replicated on collaborating Web servers that actually need to access the state data, the amount of data replicated amongst collaborating Web servers is not strictly dependent on the number of collaborating Web servers.

DETAILED DESCRIPTION OF THE INVENTION

The system and method of the present invention replicate state data among collaborating Web servers on an as-needed basis. The state data is organized into state objects, where each state object is a unit of state data replicated atomically and independently of the other state objects. For ease of reference, a collaborating Web server that writes (creates, modifies, or deletes) a state object is referred to as a "subject," while a collaborating Web server that reads a state object is referred to as an "observer." It should be noted that a same collaborating Web server may be a subject with respect to one state object and an observer with respect to a different state object. Furthermore, in some embodiments, the same collaborating Web server may be a subject with respect to a state object at one point in time and an observer of that same state object at a different point in time.

Figure 1A:
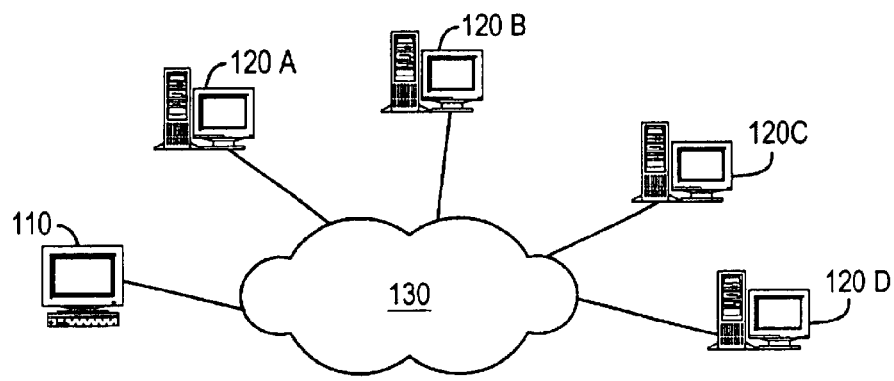
FIG. 1A is a diagram of a prior art system for distributing state data among collaborating Web servers.
Figure 1B:
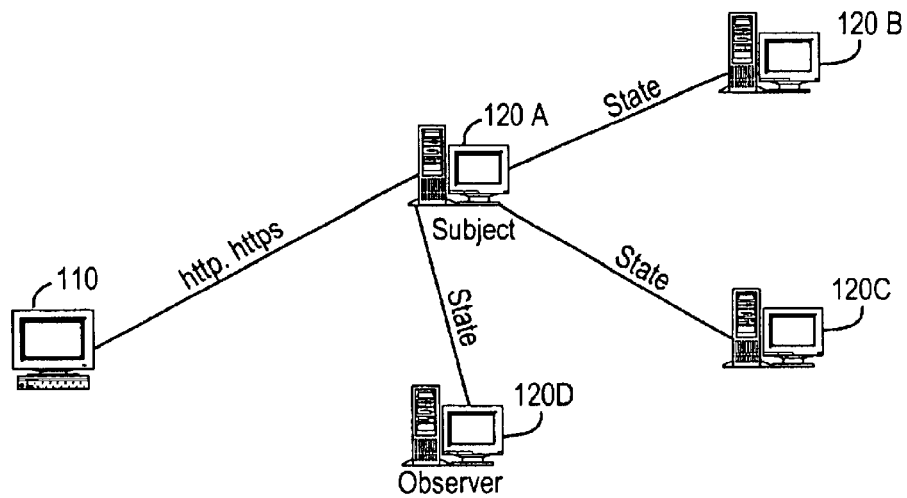
FIG. 1B is a diagram illustrating the connections among the collaborating Web servers of FIG. 1A.
Figure 2A:
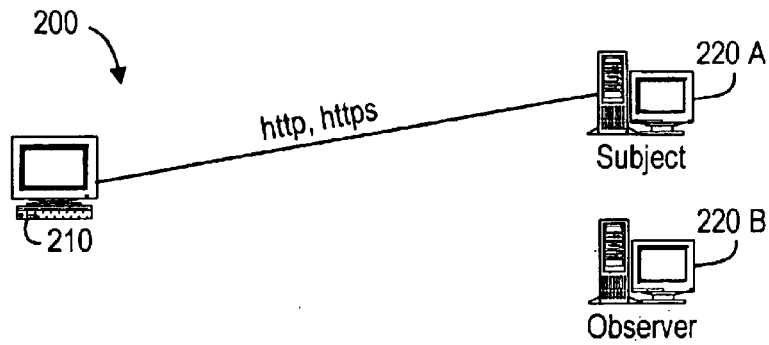
FIGS. 2A–2C are diagrams illustrating the connections among collaborating Web servers, in accordance with some embodiments of the invention.
Figure 2B:
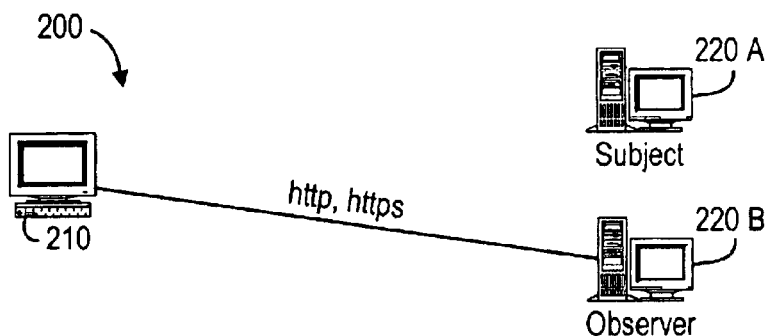
Figure 2C:
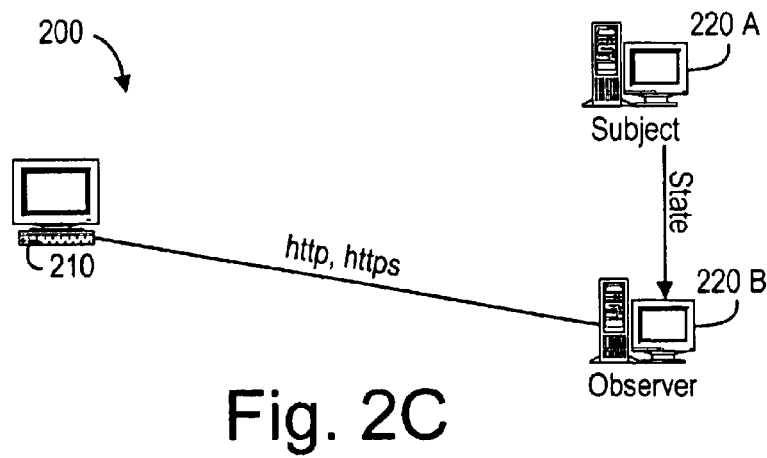

FIGS. 2A–2C illustrate a state replication system 200, in accordance with some embodiments of the invention.

Initially (FIG. 2A), client 210 establishes an HTTP/HTTPS connection to collaborating Web server 220A which results in a write to a state object X. In other words, collaborating Web server 220A is a subject with respect to state object X. The response from subject server 220A to client 210 includes a signal S, uniquely identifying this instance of state change to X on subject server 220A as the latest such instance among all collaborating Web servers. In many embodiments of the invention, signal S takes the form of an HTTP cookie shared among all the collaborating Web servers 220n.

At a later time (FIG. 2B) client 210 establishes a connection with collaborating Web server 220B, which requires collaborating Web server 220B to read state object X. In other words, collaborating Web server 220B is an observer of state object X. The request from client 210 to observer server 220B includes the prior signal S. Since the signal S indicates that subject server 220A has modified state object X, before observer server 220B can respond to client 210's request, observer server 220B must replicate the modified version of state object X from subject server A (FIG. 2C). Observer server 220B also must make note of signal S, so as not to needlessly repeat the replication in the future. Once the copy of state object X has been replicated on observer server 220B, observer server 220B can handle client 210's request. If, in responding to client 210's request collaborating Web server 220B modifies state object X, collaborating Web server 220B becomes the subject and collaborating Web server 220A becomes the observer.

Figure 3A:
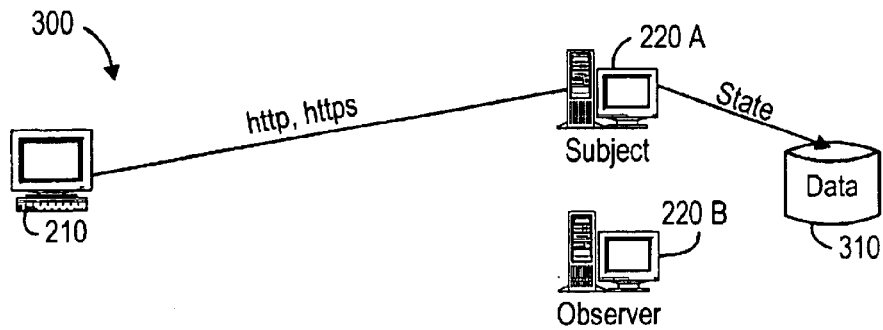
FIGS. 3A–3C are diagrams illustrating the connections among collaborating Web servers and a central database, in accordance with some embodiments of the invention.
Figure 3B:
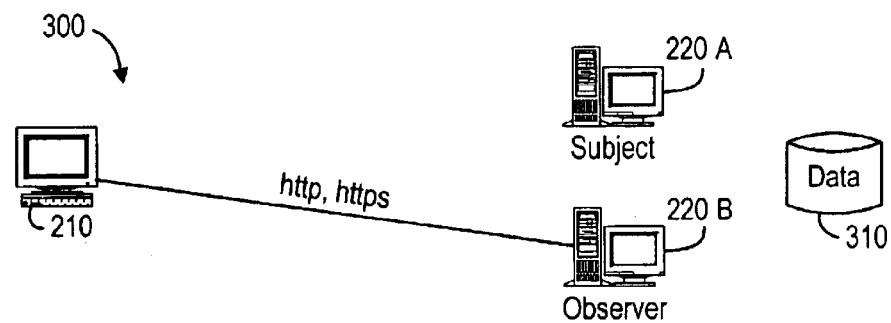
Figure 3C:
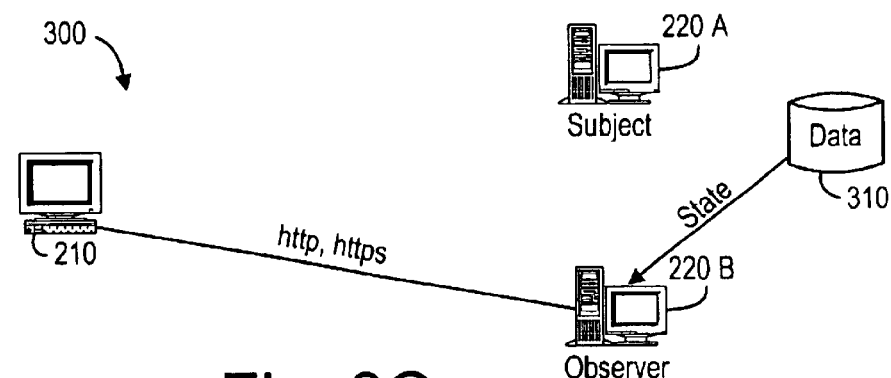

FIGS. 3A–3C illustrate a state replication system 300, in accordance with some embodiments of the invention. State replication system 300 is similar to state replication system 200 (FIGS. 2A–2C) except that a central database 310 is used to store state objects. As a result, when a subject collaborating Web server modifies a state object, the state object is stored in database 310 (FIG. 3A). Similarly, when an observer collaborating Web server needs to access the state object, the state object is retrieved from database 310.

Figure 4A:
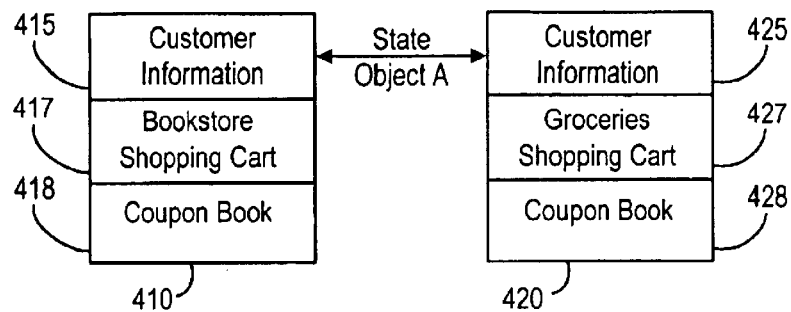
FIG. 4A is a block diagram illustrating a state object A shared between collaborating Web servers.

FIG. 4A is a block diagram illustrating the state data used by collaborating Web servers 410 and 420, in accordance with some embodiments of the present invention. In the exemplary embodiment of FIG. 4A, collaborating Web server 410 maintains a bookstore Website, while collaborating Web server 420 maintains a grocery store's Website. The state of collaborating Web server 410 includes customer information 415, bookstore shopping cart 412 and coupon book 418. Similarly, the state of collaborating Web server 420 includes customer information 425, groceries shopping cart 422 and coupon book 428. Since both states include customer information data, such state information can be shared using a state object A. As a result, when a customer updates his/her information on either collaborating Web server 410 or 420, the information is automatically shared with the other server, without requiring the customer to reenter the information. Note that other state data, such as the shopping carts and coupon books which are unique to either collaborating Web server 410 or 420, is not shared.

Figure 4B:
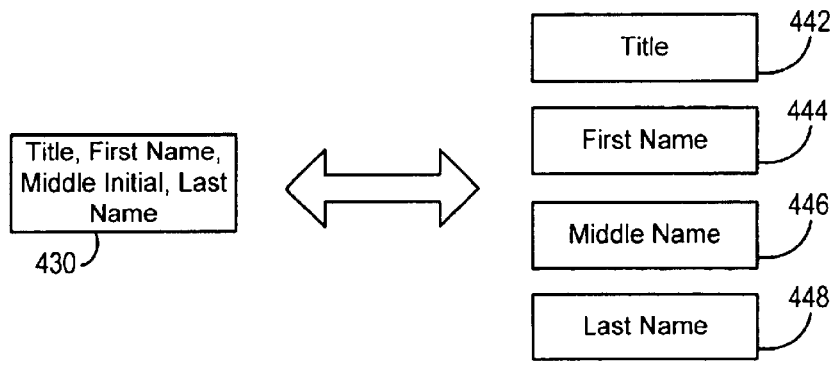
FIG. 4B is a block diagram illustrating alternative formats of a state object, in accordance with some embodiments of the invention.

A state object can also be used to share state data that is formatted differently across collaborating Web servers, as long as a mapping function is provided. For example, FIG. 4B illustrates a customer name object 430 that can be easily mapped into a title object 442, a first name object 444, a middle name object 446 and a last name object 448. When customer name object 430 is shared with a collaborating Web server using title object 442, first name object 444, middle name object 446 and last name object 448, a mapping function (e.g., concatenation or substring) is used to translate the object into the required format.

Figure 4C:
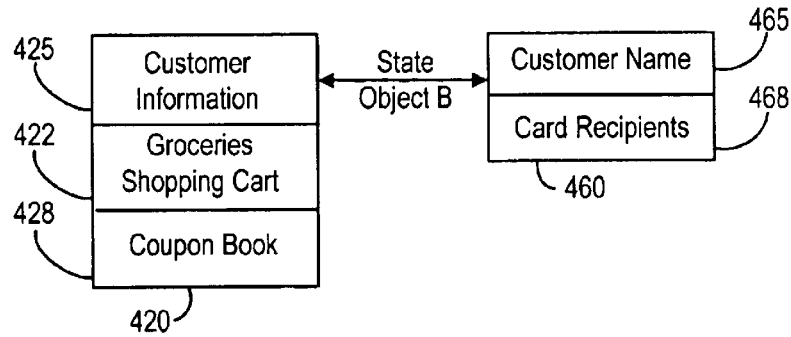
FIG. 4C is a block diagram illustrating a state object B shared between collaborating Web servers, in accordance to some embodiments of the invention.

Finally, in some embodiments a portion of a state object may be shared with another collaborating Web server. For instance, in the exemplary embodiment of FIG. 4C, state object B is shared between collaborating Web servers 420 and 460. The state of collaborating Web server 420 includes customer information 425, groceries shopping cart 422 and coupon book 428, while the state of collaborating Web server 460 includes customer name 465 and card recipients 468. Collaborating Web server 420, as explained above, maintains a grocery store Website, while collaborating Web server 460 maintains an electronic postcard Website. State object B is used to share a portion of customer information 425 with customer name 465. As in the case of FIG. 4B, an appropriate mapping function is used to translate the shared information into the appropriate format.

Figure 5A:
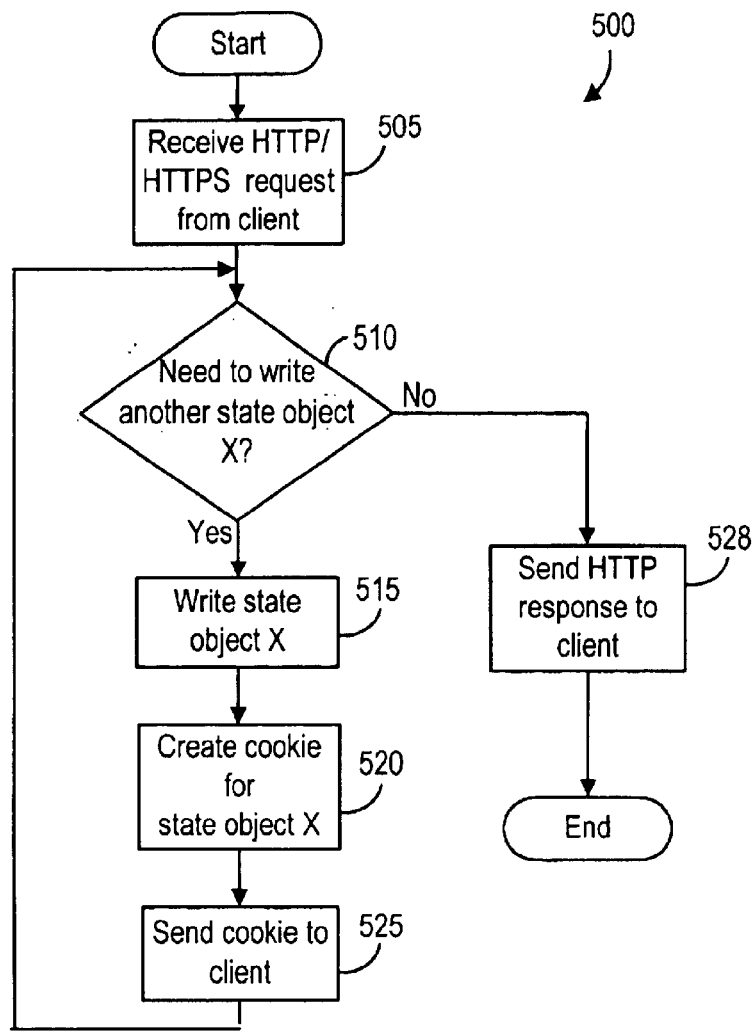
FIG. 5A is a flow diagram of the operation of a subject collaborating Web server, in accordance with some embodiments of the invention.

FIG. 5A is a flow diagram of the operation 500 of a subject collaborating Web server, in accordance with some embodiments of the present invention. Initially, collaborating Web server 220n receives an HTTP/HTTPS request from a client 210 (stage 505). Stage 510 then determines whether the request requires creation, modification, or deletion of a state object X (collectively referred to as "writes" to the state object X). Here X refers to a particular state object being shared by the subject server with one or more observer servers. There may be more than one such state object X, in which case each is considered in turn.

If, for a particular state object X, a write needs to occur, operation 500 proceeds to stage 515. In stage 515, collaborating Web server 220n writes (creates, modifies, or deletes) the state object X. In those embodiments described in FIGS. 2A–2C, this entails writing to a local copy of X on the subject server 220n. In those embodiments described by FIGS. 3A–3C, however, this entails writing to a copy of X on a remote database server 310.

In stage 520 an HTTP cookie 530 (FIG. 5B) is created to alert other collaborating Web servers 220n that the state object X has been modified by the particular subject server 220n currently executing operation 500. Cookie 530 is then sent to requesting client computer 210 (stage 525) and operation 500 proceeds back to stage 510, where writes to other state objects are considered and handled similarly. In this way, multiple state objects may be written and signaled to prospective observer servers 220n independently.

When all appropriate state objects have been considered, operation 500 proceeds to stage 528. At this stage, the HTTP response to client 210 is completed (for example, an HTML page is constructed and sent to client 210) and operation 500 terminates.

Figure 5B:
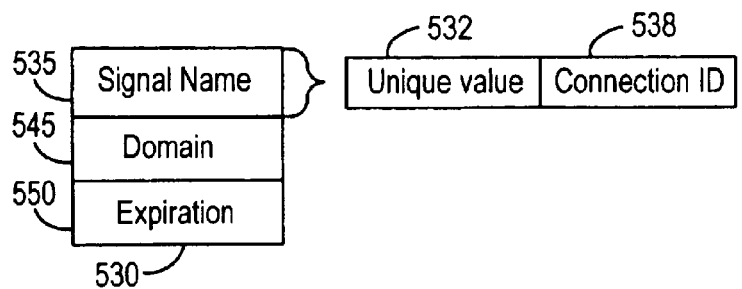
FIG. 5B is a block diagram illustrating components of an HTTP cookie, in accordance with some embodiments of the invention.

FIG. 5B is a block diagram illustrating the structure of HTTP cookie 530 created in stage 520 (FIG. 5A), in accordance to some embodiments of the invention. Cookie 530 serves to signal a state change to a particular state object X on a particular subject server 220n. Specifically, it includes a signal name 535, a domain 545 and an expiration 550. Signal name 535, in turn, includes a unique value 532 and a connection ID 538.

Signal name 535 is used to identify the state object X which has changed, and is used as the cookie name.

Domain 545 specifies the domain for which the cookie has been created. Per the HTTP cookie specification (Internet RFC 2965), it is important that the domain be expansive enough to encompass all of the collaborating Web servers 220n. Otherwise, the signal will not propagate properly to all of the observer servers. In turn, this also requires that the names of collaborating Web servers 220n all share a common network domain.

Expiration 550 specifies an optional (i.e., the expiration could be null) expiration time for the cookie, and hence the signal.

Unique value 532 is any value which, once generated, will never be repeated (for all practical purposes). For example, in some embodiments a timestamp or large pseudorandom number is used. Unique value 532 serves to uniquely identify the particular instance of the signal. Each instance of a change to state object X across the collaboration pool will have a different unique value 532.

Connection ID 538 is the information necessary to connect to the subject collaborating Web server and retrieve the state object associated with the cookie (e.g., DNS name or IP address, port number, session ID, and state object ID). The exact content of connection ID 538 may vary from one embodiment to another, as different remote method invocation protocols are used to perform the state object retrieval in different implementations. Connection ID 538, as represented in the present invention, should be understood to encompass all such possible specific contents.

Note that there is a one-to-one mapping between cookie name and signal name. In embodiments with many state objects, a single cookie, with a global cookie name, may be used. In such cases, the global cookie value is set equal to a catenation of all the signal name, unique value, and connection ID tuples for all the state objects. Stage 520 of operation 500 would then selectively update only the particular tuple associated with the current state object x, leaving the remainder of the cookie contents (i.e., the remaining tuples associated with other state objects) effectively unchanged.

Figure 5C:
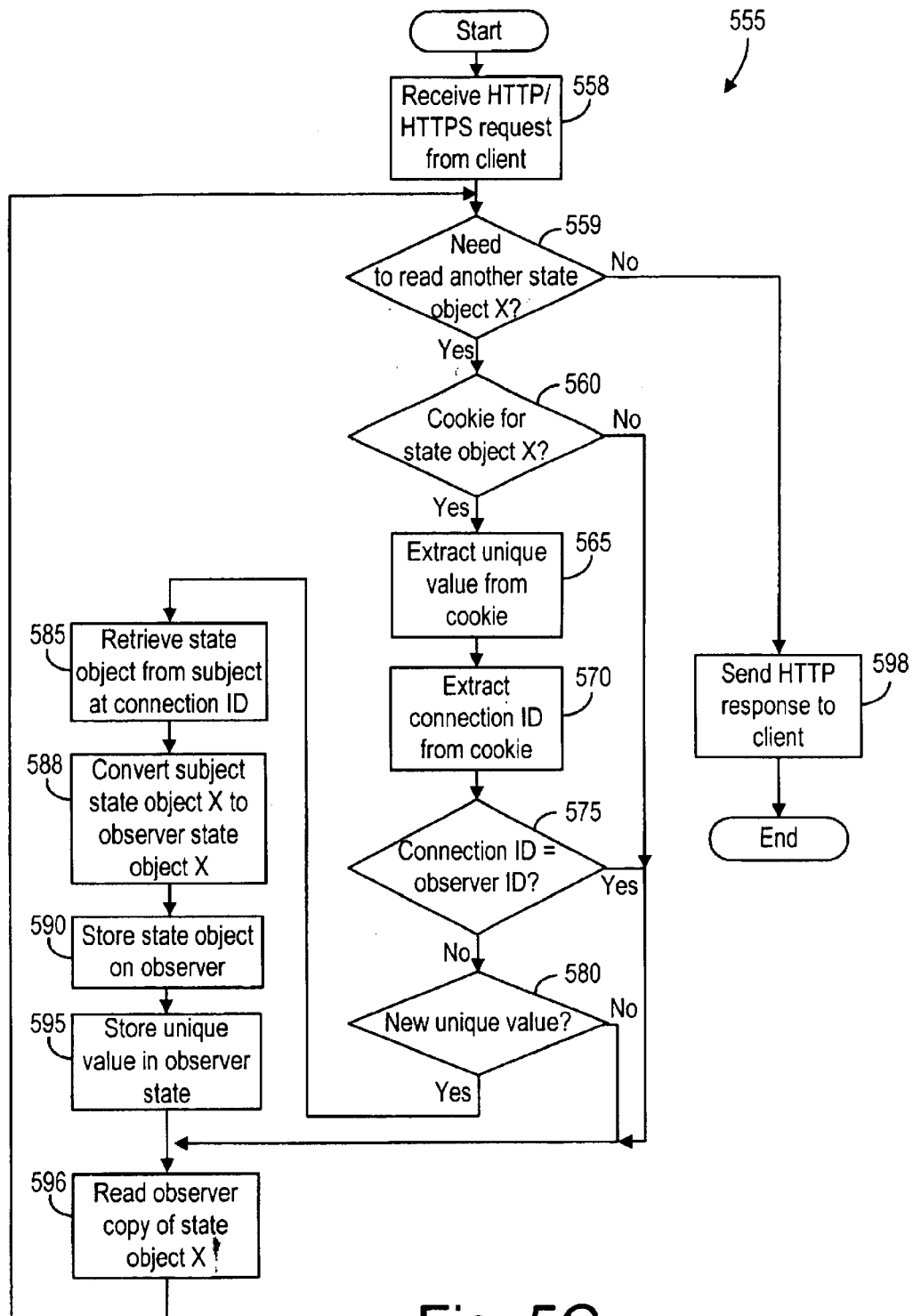
FIG. 5C is a flow diagram of the operation of an observer collaborating Web server, in accordance with some embodiments of the invention.

FIG. 5C is a flow diagram of the operation 555 of an observer collaborating Web server, in accordance with some embodiments of the present invention. Initially, collaborating Web server 220n receives an HTTP/HTTPS request from client 210 (stage 558). Stage 559 then determines whether the request requires reading state object X during operation 555. Here X is a particular state object being shared among all collaborating Web servers 220n. There may be more than one such state object X, in which case each will be considered in turn. In those embodiments described in FIGS. 2A–2C, reading occurs against a local copy of X contained on the observer server 220n. In those embodiments described in FIGS. 3A–3C, reading occurs against a remote copy of X contained on a database server 310.

If, for a particular state object X, a read needs to occur, operation 555 proceeds to stage 560. Stage 560 determines whether there is an HTTP cookie associated with state object X present in the client request. As shown in FIG. 5B, this cookie 530 serves to alert observer servers 220n of a change to state object X having occurred on a particular subject server. If no such cookie 530 exists, this means there is no update to state object X awaiting replication to the observer server 220n, so operation 555 proceeds to read the local copy of state object X (stage 596). If the cookie 530 does exist, however, its unique value 532 and connection ID 538 are then extracted (stages 565 and 570, respectively).

Stage 575 then determines whether connection ID 538 corresponds to the same observer collaborating Web server 220n as is currently executing operation 555. Such occasion means that the update to X which is being signaled by the cookie actually originated with this same collaborating Web server 220n (which at the time was acting in the capacity of subject to state object X). In that case, of course, no replication is necessary, so operation 555 proceeds to read the local copy of state object X (stage 596). Otherwise, it is indicated that the update to X originated on a different collaborating Web server 220n, in which case operation 555 proceeds to stage 580.

Stage 580 then determines whether the unique value 532 is already stored in the state of observer server 220n. Such occasion means that the update to X being signaled by the cookie has already been replicated onto this observer server 220n, so operation 555 proceeds to read the local copy of state object X (stage 596). Otherwise, a new update to X, needing replication onto this observer server 220n, is indicated. Operation 555 then proceeds to stage 585.

Stages 585 through 595 perform the tasks associated with replicating the state object X onto the observer server 220n. First, the state object is retrieved from the subject server 220n specified by connection ID 538 (stage 585). Specifically, the observer server 220n uses an appropriate client interface to perform the retrieval from an appropriate state-retrieval server object operating on the subject server 220n. A variety of different application-layer protocols could be used in various embodiments to perform this retrieval, built upon a number of different remote method invocation protocols (such as Java RMI, SOAP, DCE, etc). Likewise, a variety of application client interfaces and server objects could communicate using any of the protocols to accomplish the retrieval of state object X at stage 585. Thus the present invention is not limited to any particular technique for performing the retrieval at stage 585.

The retrieved state object X, having come from a remote subject server 220n, is then converted into the preferred representation for that state object on the observer server 220n (stage 588). For example, stage 588 would perform the conversion between formats shown in FIG. 4B. In embodiments in which there are no differences in representation of state object X among collaborating Web servers 220n, stage 588 simply performs no work.

The state object X, now converted (if necessary) into the preferred representation for the observer server 220n, is then stored to state for observer server 220n (stage 590). Likewise, unique value 532 is added to the state of observer server 220n (stage 595) to ensure that cookie 530 would not cause the state object to be needlessly copied from the subject server 220n to the observer server 220n again in the future. As noted above, such state may be stored locally on the observer server 220n (as in FIGS. 2A–2C) or remotely on a database server accessible to it (as in FIGS. 3A–3C). State object X is now replicated, and so operation 555 may proceed to read the newly-updated local copy of state object X at stage 596.

Operation 555 proceeds back to stage 559, where reads from other state objects are considered and handled similarly. In this way, multiple state objects may be replicated and read from various subject servers 220n independently. When all appropriate state objects have been considered, operation 555 proceeds to stage 598. At this stage, the HTTP response to client 210 is completed (for example, an HTML page is constructed and sent to client 210) and operation 555 terminates.

Appendix A, which is part of the present disclosure, contains definitions of terms used in some embodiments of the invention.

Appendix B, which is part of the present disclosure, contains pseudo-code listings of computer programs executed by subject and observer collaborating Web servers in some embodiments of the invention.

Embodiments described above illustrate, but do not limit the invention. In particular, the invention is not limited by any particular hardware/software implementation. Other hardware/software configurations known in the art can be used in place of those described herein. In addition, the stages of process 500 and 555 can be performed in an arbitrary order, unless otherwise indicate in the description above. Other embodiments and variations are within the scope of the invention, as defined by the following claims.

---

APPENDIX A

State Object ::= Data to be replicated atomically between
 Web servers. It may be transient data (in
 existence only for the duration of a Web
 client/server session) or persistent data (in
 existence across multiple Web client/server
 sessions). It may be replicated literally, or
 transformed between different internal
 representations. The repository for a State
 Object may be the Web server itself, or a separate
 database or file server on which the Web server
 keeps its state data. Finally, a Web server's

---

-continued

APPENDIX A total state may consist of multiple State Objects,
 replicated independently of one another, plus non-
 replicated state as well.
 Example: One Web server hosts an online bookstore.
 Its total state consists of a customer information
 record (name, etc), a bookstore shopping cart, and
 a history of book purchases. Another Web server
 hosts an online grocery store. Its total state
 consists of an identically-structured customer
 information record, a groceries shopping cart, and
 a coupon book. The customer information record
 could be a State Object for replication between
 the servers.
 Example: Consider the book and grocery
 applications in the previous example. Both
 include postal address within the customer
 information State Object, but they represent
 customer name differently. The bookstore
 represents name as "title", "first name", "middle
 name", and "last name". The grocery store
 represents name as just a single field. But even
 though the customer information structures are not
 literally identical in this example, because there
 is a heuristic for transforming mechanically from
 one representation to the other, the customer
 information still qualifies as a replicatable
 State Object.
 Example: Consider the book and grocery
 applications again, with a third Web server
 hosting an online greeting card application. Its
 total state consists of customer name and list of
 card recipients. The name could be one State
 Object A for replication between all 3 servers.
 The remainder of the customer information record
 (consisting of the email address, postal address,
 etc) could be another State Object B for
 replication just between the book and grocery
 applications.
Collaborating Web server ::= Any Web server which desires to
 replicate one or more State Objects with one or
 more other Collaborating Web servers.
 Collaborating Web servers do not have to be
 hosting the same applications; they just need to
 have at least one State Object in common
 (literally or via transformation).
 Example: The book, grocery, and greeting card Web
 servers in the previous example are all
 Collaborating Web servers to varying degrees. The
 book and grocery servers are Collaborating Web
 servers for State Objects A and B. The greeting
 card server is just a Collaborating Web server for
 State Object A.
Collaboration Pool ::= All of the Collaborating Web servers
 for a State Object. All servers in a Collaboration
 Pool must share a common network domain (this is
 necessary for the cookie signal to work).
 Example: The book, grocery, and greeting card
 servers in the previous example have DNS names all
 ending in ".etail.com". They form a Collaboration
 Pool.
Subject ::= Any Web server which performs write operations
 (initialize, modify, delete) to its local copy of
 the State Object. That is, for State Object X,
 each Web server which writes to its own local copy
 of X is a Subject for X. A Web server may have
 many State Objects it is replicating, in which
 case it is Subject or Observer (or both) for each
 State Object independently.
 Example: See Observer example, below.
Observer ::= Any Web server which reads its local copy of
 the State Object. That is, for State Object X,
 each Web server which reads its own local copy of
 X is an Observer of X. A Web server may have many
 State Objects it is replicating, in which case it
 is Subject or Observer (or both) for each State
 Object independently.
 Example: Consider the book, grocery, and greeting -continued

APPENDIX A card Web servers described in the previous
example. Each of them reads the customer name
(State Object A), and each of them writes to it as
well. Thus all are Subjects and Observers for A,
the customer name State Object. Conversely, only
the book and grocery servers read the remainder of
the customer information State Object B, and only
the book server writes it. Thus the book server
is a Subject and Observer for B, the grocery
server is just an Observer for B, and the greeting
card server is neither.
Client ::= Any Web client which supports and accepts HTTP
cookies. Cookies must be supported and accepted
for this to work.

APPENDIX B

SUBJECT SERVER ALGORITHM
---
The following algorithm is implemented as a server-side
component (for example, as a library routine or class method
used by a server API plugin, servlet, CGI or FastCGI
program) on Subject machines for a given State Object X.
    The algorithm is executed by the Subject when an HTTP
or HTTPS request is received which causes the server to
(possibly among other things) write its local copy of State
Object X. Writing consists of initializing, modifying, or
deleting. The algorithm is executed immediately after
writing X. Conversely, this algorithm is bypassed for all
other requests.
/* SUBJECT ALGORITHM: Perform this whenever State Object X
is written. */
UniqueValueX      = Some value unique to this instance write of
                    X, eg: clocktime or large random number
SubjectConnIDX    = Connection info for retrieving X from this
                    Subject's state repository, eg: DNS name
                    or IP address, port number, session ID,
                    and state object ID
SignalValueX      = UniqueValueX + SubjectConnIDX
SignalNameX       = The cookie name of the signal for X
SignalDomainX     = The common network domain for the
                    Collaboration Pool for X
SignalExpiresX    = The desired expiration time for the signal
                    for X, if any
Emit HTTP Response Header:
    Set-Cookie:    SignalNameX=SignalValueX;
                   Domain=SignalDomainX;
                   Expires=SignalExpiresX
/* Done. Return from this component and resume handling the
request. */
OBSERVER SERVER ALGORITHM
---
The following algorithm is implemented as a server-side
component on Observer machines for a given State Object X.
    The algorithm is executed by the Observer when an HTTP
or HTTPS request is received which causes the server to
desire to read from its local copy of State Object X. The
algorithm is initiated before the first such read per
request; subsequent reads in the same request do not need to
execute the algorithm. This algorithm is bypassed for all
other types of requests.
/* OBSERVER ALGORITHM: Perform this before reading State
Object X for the first time in this request. */
SignalNameX = The cookie name of the signal for X
IF (Cookie named SignalNameX exists) {
/* A signal cookie for X is defined. Get and test its
value. */
    UniqueValueX = Read from the SignalNameX cookie value
    SubjectConnIDX = Read from the SignalNameX cookie value
    IF (SubjectConnIDX IS NOT this server's SubjectConnID AND
        /* Prevents Observer from replicating changes from
           itself as Subject */

-continued

APPENDIX B

UniqueValueX IS NOT in Observer state) {
        /* Prevents an Observer from replicating changes it
           already knows about */
        /* State Object X has changed on a remote Subject.
Retrieve the new copy of X from the Subject, convert it to
the local format as needed, and store it and the new Unique
Value locally. */
            New SubjectStateObjectX =
                Retrieve from SubjectIDX using agreed-upon RPC
                mechanism with parameters taken from SubjectConnIDX
                /* Implementation varies */
            New ObserverStateObjectX =
                Convert from SubjectStateObjectX as needed
                /* Implementation varies */
            Store ObserverStateObjectX to Observer state
                /* Overwrite prior copy of X */
            Store UniqueValueX to Observer state
                /* For use next time */
        }
}
/* Done. Return from this component and resume handling the
request. */

We claim:

1. A computer system for replicating server-side state information among a plurality of collaborating Web servers, the system comprising:

a plurality of collaborating Web servers connected to a computer network; and a computer program executable by one or more of the collaborating Web servers, wherein the computer program comprises computer instructions for:

receiving a current request from a remote client entailing an operation on a local copy of server-side state information;

retrieving information associated with the request indicating the most recent modification to the server-side state information by a collaborating Web server;

determining, based on the retrieved information, whether the server-side state information has been modified by another collaborating Web server since a previous operation on the local copy of the server-side state information by the client; and if the server-side state information has been modified, requesting a copy of the server-side state information from the last collaborating Web server to modify the server-side state information, receiving the requested copy, and storing the received copy as the local copy.

2. The computer system of claim 1, wherein the computer program further comprises computer instructions for:

wherein the retrieving further comprises retrieving a cookie stored on a client computer and extracting a unique value and a connection identifier from the cookie; and wherein the determining further comprises determining whether the server-side state information associated with the cookie has been modified based on the unique value and the connection identifier.

3. The computer system of claim 2, wherein the computer program further comprises computer instructions for:

comparing the unique value extracted from the cookie to one or more unique values stored on the collaborating Web server; and comparing the connection identifier to a connection identifier associated with the collaborating Web server.

4. The computer system of claim 3, wherein the server-side state information has been modified only if the unique value extracted from the cookie does not match any of the unique values stored on the collaborating Web server and the connection identifier extracted from the cookie does not match the connection identifier associated with the collaborating Web server.

5. The computer system of claim 1, wherein the computer program further comprises computer instructions for:
if the current request entails a modify operation on the local copy of the server-side state information, modifying the local copy of the server-side state information, and sending information to a client computer indicating that the server-side state information has been modified by the collaborating Web server.

6. The computer system of claim 5, wherein the computer program further comprises computer instructions for:
wherein the sending further comprises generating a cookie associated with the server-side state information, and sending the cookie to the client computer.

7. The computer system of claim 6, wherein the cookie includes a unique value generated by the collaborating Web server and a connection identifier associated with the collaborating Web server.

8. The computer system of claim 7, wherein the unique value is a timestamp.

9. The computer system of claim 7, wherein the unique value is a pseudorandom number.

10. The computer system of claim 1, wherein the copy of the server-side state information is transferred using a remote procedure call (RPC).

11. The computer system of claim 1, wherein the server-side state information being modified is a portion of another server-side state information.

12. The computer system of claim 1, wherein the computer program further comprises computer instructions for converting the copy of the server-side state information from a first data format into a second data format.

13. The computer system of claim 2, wherein the computer program further comprises computer instructions for storing the copy of the state unique value on the collaborating Web server.

14. A method of replicating server-side state information among a plurality of collaborating Web servers connected to a computer network, the method comprising:
receiving a current request from a remote client entailing an operation on a local copy of server-side state information,
retrieving information associated with the request indicating the most recent modification to the server-side state information by a collaborating Web server;
determining, based on the retrieved information, whether the server-side state information has been modified by another collaborating Web server since a previous operation on the local copy of the server-side state information by the client; and
if the server-side state information has been modified, requesting a copy of the server-side state information from the last collaborating Web server to modify the server-side state information, receiving the requested copy, and storing the received copy as the local copy.

15. The method of claim 14, further comprising:
wherein the retrieving further comprises retrieving a cookie stored on a client computer;
extracting a unique value and a connection identifier from the cookie; and wherein the determining further comprises determining whether the server-side state information associated with the cookie has been modified based on the unique value and the connection identifier.

16. The method of claim 15, further comprising:
comparing the unique value extracted from the cookie to one or more unique values stored on the collaborating Web server; and
comparing the connection identifier to a connection identifier associated with the collaborating Web server.

17. The method of claim 16, wherein the server-side state information has been modified only if the unique value extracted from the cookie does not match any of the unique values stored on the collaborating Web server and the connection identifier extracted from the cookie does not match the connection identifier associated with the collaborating Web server.

18. The method of claim 14, further comprising:
if the current request entails a modify operation on the local copy of the server-side state information, modifying the local copy of the server-side state information; and
sending information to a client computer indicating that the server-side state information has been modified by the collaborating Web server.

19. The method of claim 18, further comprising:
wherein the sending further comprises generating a cookie associated with the server-side state information; and
sending the cookie to the client computer.

20. The method of claim 19, wherein the cookie includes a unique value generated by the collaborating Web server and a connection identifier associated with the collaborating Web server.

21. The method of claim 20, wherein the unique value is a timestamp.

22. The method of claim 20, wherein the unique value is a pseudorandom number.

23. The method of claim 14, wherein the copy of the server-side state information is transferred using a remote procedure call (RPC).

24. The method of claim 14, wherein the server-side state information being modified is a portion of another server-side state information.

25. The method of claim 14, further comprising converting the copy of the server-side state information from a first data format into a second data format.

26. The method of claim 15, further comprising storing the unique value on the collaborating Web server.

27. A computer-readable storage medium storing a computer program executable by one or more collaborating Web servers connected to a computer network, wherein the computer program comprises computer instructions for:
receiving a current request from a remote client entailing an operation on a local copy of server-side state information;
retrieving information associated with the request indicating the most recent modification to the server-side state information by a collaborating Web server;
determining, based on the retrieved information, whether the server-side state information has been modified by another collaborating Web server since a previous operation on the local copy of the server-side state information by the client; and
if the server-side state information has been modified, requesting a copy of the server-side state information from the last collaborating Web server to modify the server-side state information, receiving the requested copy, and storing the received copy to the local copy.

28. The computer-readable storage medium of claim 27, wherein the computer program further comprises computer instructions for:
wherein the retrieving further comprises retrieving a cookie stored on a client computer;
extracting a unique value and a connection identifier from the cookie; and
wherein the determining further comprises determining whether the server-side state information associated with the cookie has been modified based on the unique value and the connection identifier.

29. The computer-readable storage medium of claim 28, wherein the computer program further comprises computer instructions for:
comparing the unique value extracted from the cookie to one or more unique values stored on the collaborating Web server; and
comparing the connection identifier to a connection identifier associated with the collaborating Web server.

30. The computer-readable storage medium of claim 29, wherein the server-side state information has been modified only if the unique value extracted from the cookie does not match any of the unique values stored on the collaborating Web server and the connection identifier extracted from the cookie does not match the connection identifier associated with the collaborating Web server.

31. The computer-readable storage medium of claim 27, wherein the computer program further comprises computer instructions for:
if the current request entails a modify operation on the local copy of the server-side state information, modifying the local copy of the server-side state information; and
sending information to a client computer indicating that the server-side state information has been modified by the collaborating Web server.

32. The computer-readable storage medium of claim 31, wherein the computer program further comprises computer instructions for:
wherein the sending further comprises generating a cookie associated with the server-side state information; and
sending the cookie to the client computer.

33. The computer-readable storage medium of claim 32, wherein the cookie includes a unique value generated by the collaborating Web server and a connection identifier associated with the collaborating Web server.

34. The computer-readable storage medium of claim 33, wherein the unique value is a timestamp.

35. The computer-readable storage medium of claim 34, wherein the unique value is a pseudorandom number.

36. The computer-readable storage medium of claim 27, wherein the copy of the server-side state information is transferred using a remote procedure call (RPC).

37. The computer-readable storage medium of claim 27, wherein the server-side state information being modified is a portion of another server-side state information.

38. The computer-readable storage medium of claim 27, wherein the computer program further comprises computer instructions for converting the copy of the server-side state information from a first data format into a second data format.

39. The computer-readable storage medium of claim 28, wherein the computer program further comprises computer instructions for storing the unique value on the collaborating Web server.

* * * * *